United States Patent
Mai et al.

(10) Patent No.: US 8,964,381 B2
(45) Date of Patent: Feb. 24, 2015

(54) ELECTRONIC DEVICE LOCKING/UNLOCKING MECHANISM

(75) Inventors: Chien Cheng Mai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 353 days.

(21) Appl. No.: 13/534,107

(22) Filed: Jun. 27, 2012

(65) Prior Publication Data
US 2014/0002963 A1 Jan. 2, 2014

(51) Int. Cl.
  *G06F 1/16* (2006.01)
  *H05K 5/00* (2006.01)
  *H05K 7/00* (2006.01)

(52) U.S. Cl.
  USPC ............ 361/679.59; 361/679.06; 361/679.27; 361/728; 361/747

(58) Field of Classification Search
  USPC ................. 361/728, 729, 730, 732, 735, 747, 361/679.01, 679.02, 679.06, 679.27, 361/679.29, 679.57, 679.58, 679.59; 248/919, 920, 921, 922, 923
  See application file for complete search history.

(56) References Cited

U.S. PATENT DOCUMENTS

| | | | | |
|---|---|---|---|---|
| 4,552,418 A | * | 11/1985 | Sarnezki et al. | 312/242 |
| 6,430,038 B1 | * | 8/2002 | Helot et al. | 361/679.05 |

* cited by examiner

*Primary Examiner* — Hoa C Nguyen
*Assistant Examiner* — Binh Tran
(74) *Attorney, Agent, or Firm* — Rosenberg, Klein & Lee

(57) ABSTRACT

An electronic device locking/unlocking mechanism assembled with an electronic device. The locking/unlocking mechanism includes a connection arm movable between a first position and a second position. The connection arm has a first end and a second end. An elastic unit is disposed at the first end of the connection arm to normally apply an elastic force to the connection arm for keeping the connection arm positioned in the first position. A locking section is disposed at the second end of the connection arm. The locking section is held in a dent formed on the electronic device. When the connection arm is moved to the second position, the locking section is released from the held state, whereby a pivot pin is unstressed to automatically bound open the electronic device. This eliminates the problem existing in the conventional mechanism that the electronic device is uneasy to open.

24 Claims, 3 Drawing Sheets

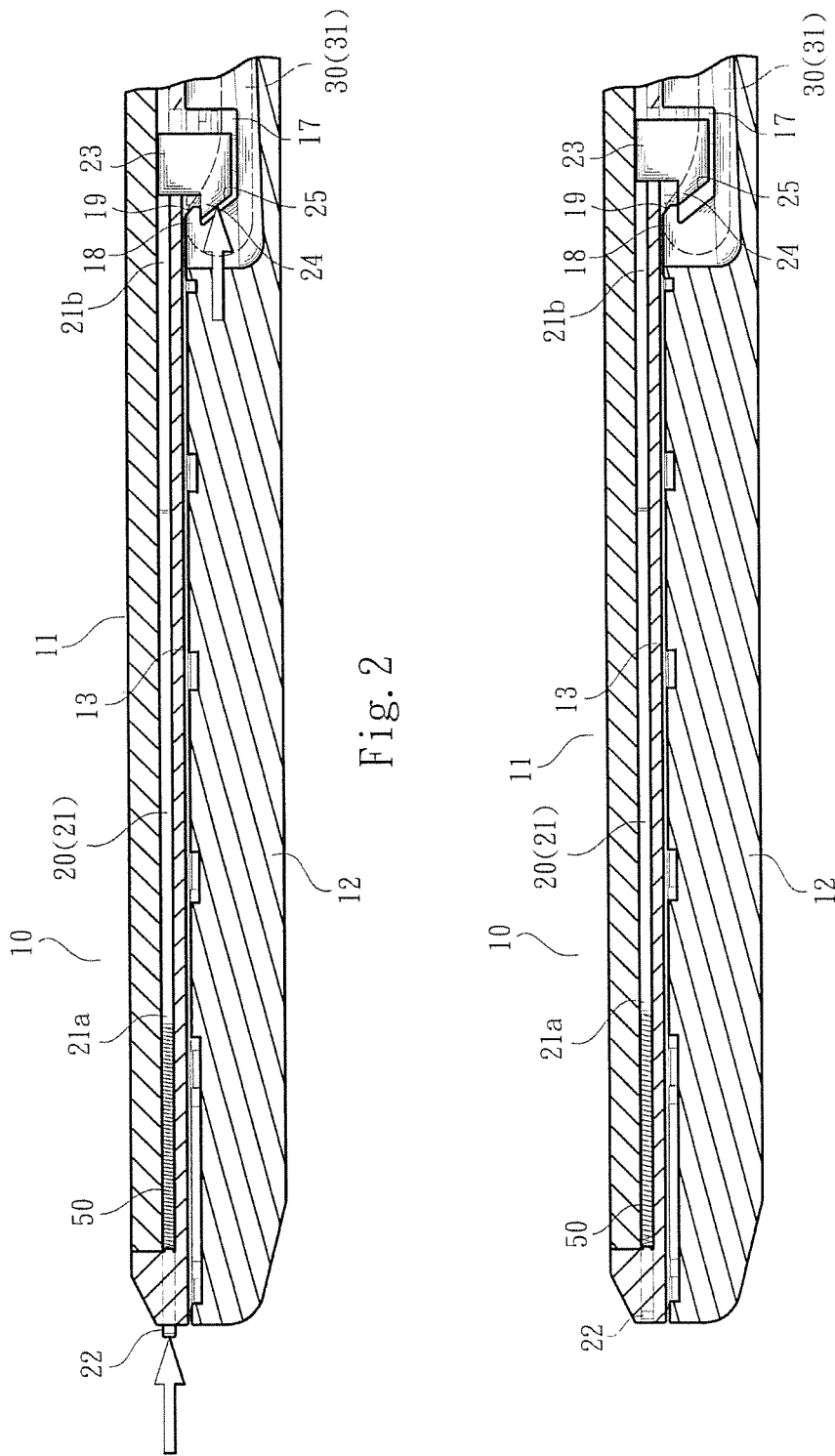

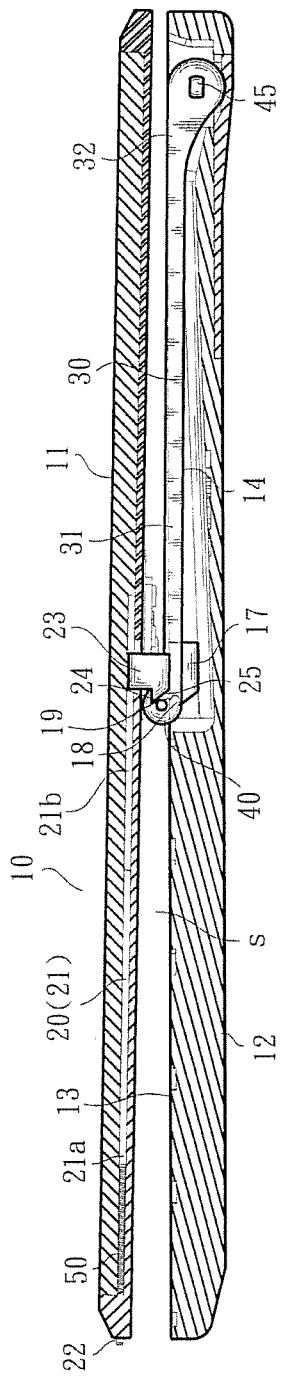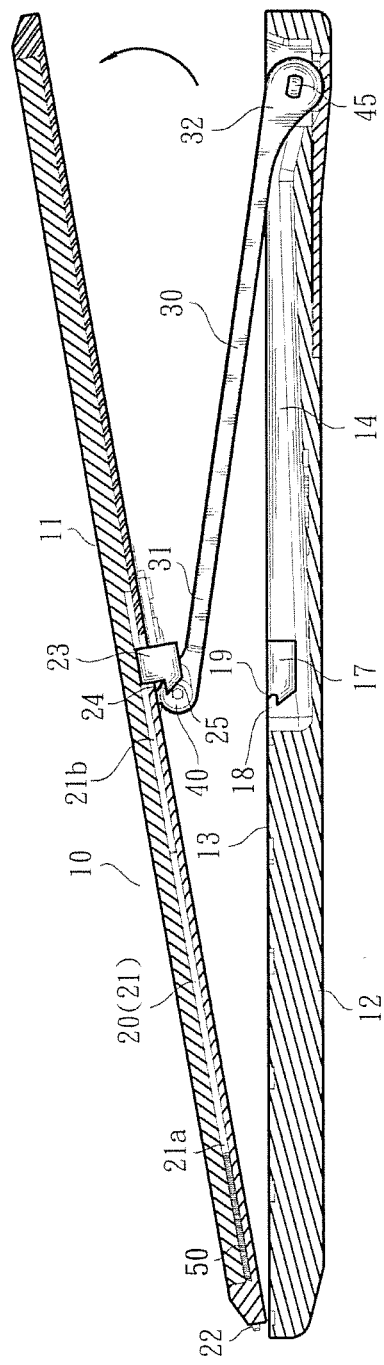
Fig. 4
Fig. 5

ELECTRONIC DEVICE LOCKING/UNLOCKING MECHANISM

BACKGROUND OF THE INVENTION

1. Field of the Invention

The present invention relates generally to an electronic device locking/unlocking mechanism, and more particularly to an electronic device locking/unlocking mechanism, which includes a connection arm movable between a first position and a second position for controlling locking/unlocking of the electronic device. In addition, in cooperation with a pivot pin, the electronic device locking/unlocking mechanism enables a cover or a display screen of the electronic device to automatically bound open.

2. Description of the Related Art

There are various electronic devices provided with covers or display screens, such as cellular phones, notebook computers, electronic books and digital imagers. The covers or display screens are pivotally mounted on the electronic devices via pivot pins (or rotational shafts), whereby the covers or display screens can be freely rotated and opened/closed under external force.

Basically, the conventional locating module includes an enclosure-type pivot pin or multiple disc-shaped washers, which are stacked in the same direction or reverse direction and assembled on a pivot pin. The washers are tightened by a nut, whereby when the pivot pin is rotated, the washers provide an elastic holding effect or frictional resistance against the rotation of the cover or display screen so as to locate the cover or display screen in a desired position after opened.

There is a kind of conventional pivot pin mechanism mounted on the electronic device. Such pivot pin mechanism generally has an elastic unit. When the cover or display screen of the electronic device is rotated to a position near the closed position, the elastic unit applies an elastic force to the cover or display screen to automatically close the cover or display screen onto the device body module of the electronic device. This lowers the resistance against closing of the cover or display screen to save strength of a user and facilitate the operation. However, as known by those skilled in this field, while lowering the resistance against closing of the cover or display screen, the resistance against opening of the cover or display screen is increased so that the user has to apply a greater force to the cover or display screen for opening the same.

There is a trend to design more lightweight, miniaturized and slimmed electronic device. Therefore, it has become harder and harder to open the cover or display screen of the electronic device. A user often needs to try several times before he/she can successfully open the cover or display screen. Also, when opening the cover or display screen, the pressure exerted onto the user's hand is increased and the operation hand feeling of the user is poor. This is not what we expect.

According to the aforesaid, it is known that the structural design of the cover or display screen, the device body module and the relevant components (such as the pivot pin and the locating module) of the conventional device has some shortcomings that need to be overcome. It is therefore tried by the applicant to provide an electronic device locking/unlocking mechanism to eliminate the problems existing in the conventional device. Without changing the lightweight, miniaturized and slimmed structure of the electronic device, the electronic device locking/unlocking mechanism can solve the above problem existing in the conventional device that it is hard to open the cover or display screen of the electronic device and a user often needs to try several times before he/she can successfully open the cover or display screen. By means of the electronic device locking/unlocking mechanism, when opening the cover or display screen, the pressure exerted onto the user's hand is decreased and the operation hand feeling of the user is enhanced.

SUMMARY OF THE INVENTION

It is therefore a primary object of the present invention to provide an electronic device locking/unlocking mechanism, which is assembled with an electronic device. The locking/unlocking mechanism includes a connection arm movable between a first position and a second position. The connection arm has a first end and a second end. An elastic unit is disposed at the first end of the connection arm to normally apply an elastic force to the connection arm for keeping the connection arm positioned in the first position. A locking section is disposed at the second end of the connection arm. The locking section is held in a dent formed on the electronic device. When the connection arm is moved to the second position, the locking section is released from the held state, whereby a pivot pin is unstressed to automatically bound open the electronic device. This eliminates the problems of the conventional mechanism that the electronic device is uneasy to open and the pressure exerted on a user's hand is increased.

To achieve the above and other objects, the electronic device includes a movable module (such as a cover or a display screen) and a device body module. The connection arm is disposed on the movable module. The dent is formed on the device body module. The locking section has a latch. The dent is formed with a stop section corresponding to the latch. When the connection arm is moved between the first and second positions, the latch is latched with the stop section to lock the movable module in a fully closed state or unlatched from the stop section, permitting the movable module to be opened.

A support arm is disposed between the movable module and the device body module. The support arm has two pivoted ends at which pivot pins are mounted, whereby the support arm is pivotally connected to the movable module and the device body module via the pivot pins respectively. When the movable module is fully closed on the device body module, the pivot pins are stressed to store energy and when the connection arm is moved to the second position to unlatch the latch from the stop section, the pivot pin unstressed to release the energy so as to automatically bound open the movable module to form a gap between the movable module and the device body module. In this case, a user can conveniently rotate and open the movable module in cooperation with the support arm and locate the movable module on the device body module for a user to watch or operate.

In principle, the support arm is disposed between the movable module and the device body module for supporting and locating the movable module on the device body module. The locking/unlocking mechanism is disposed on at least one of the movable module and the device body module. When the movable module is closed onto the device body module, the locking/unlocking mechanism is held to lock the movable module. At least one of the pivot pins is able to provide a frictional locating resistance, whereby when the movable module is fully closed on the device body module, the pivot pin is stressed to store energy and when the movable module is unlocked, the pivot pin unstressed to release the energy so as to automatically bound open the movable module to form a gap between the movable module and the device body module.

The present invention can be best understood through the following description and accompanying drawings, wherein:

BRIEF DESCRIPTION OF THE DRAWINGS

FIG. 2 is a partially sectional assembled view according to FIG. 1, showing the connection arm is positioned in the first position and the latch is latched with the stop section in a locked state;

FIG. 3 is a partially sectional assembled view according to FIG. 1, showing the connection arm is positioned in the second position and the latch is unlatched from the stop section in an unlocked state;

FIG. 4 is a sectional view showing the operation of the present invention, in which the movable module is bounded open and a gap is formed between the movable module and the device body module; and FIG. 5 is another sectional view showing the operation of the present invention, in which the movable module is rotated and opened in cooperation with the support arm and the pivot pin.

DETAILED DESCRIPTION OF THE PREFERRED EMBODIMENTS

Figure 1:
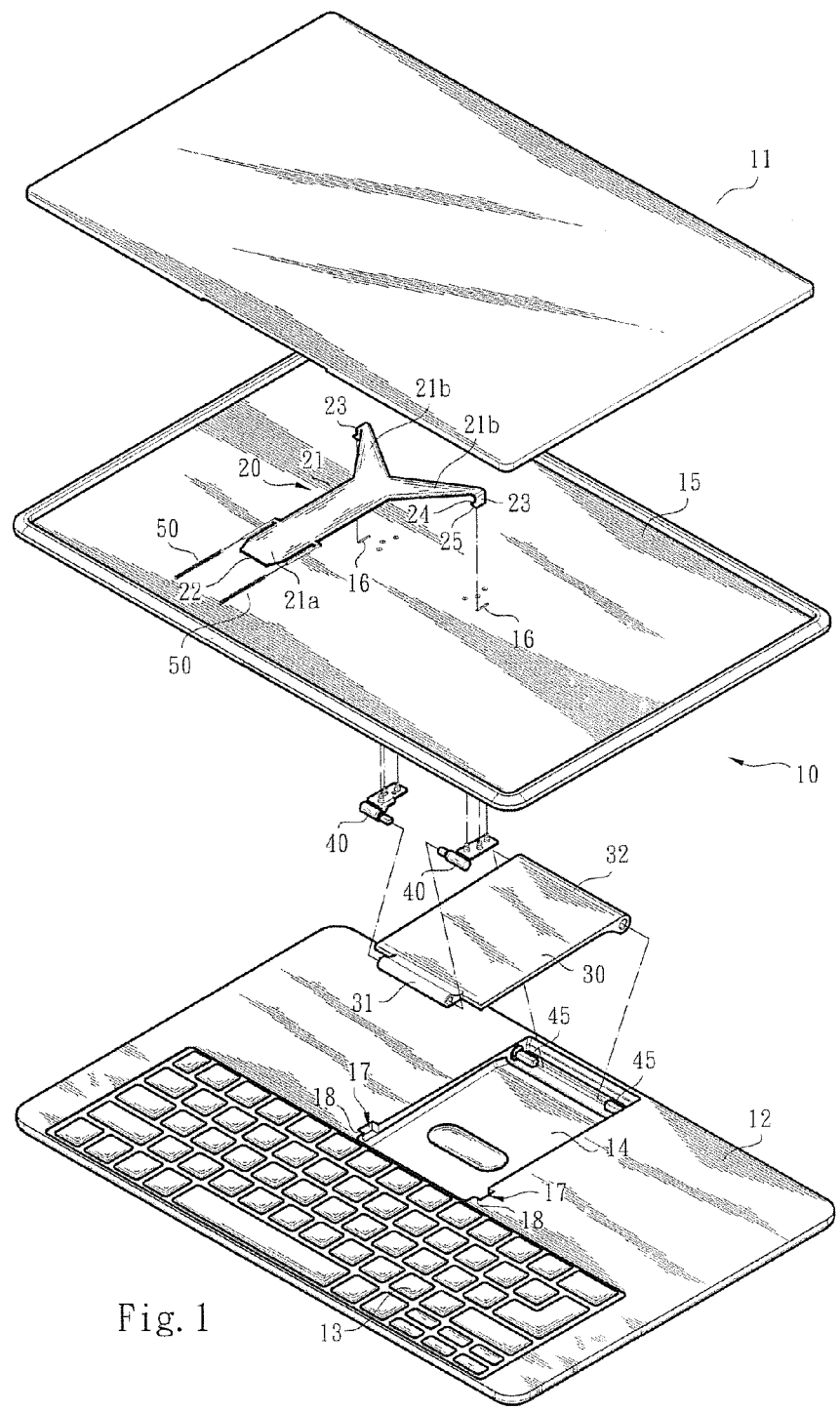
FIG. 1 is a perspective exploded view showing the electronic device locking/unlocking mechanism of the present invention and the electronic device.

Please refer to FIGS. 1 and 2. The electronic device locking/unlocking mechanism 20 of the present invention is assembled with an electronic device 10. The electronic device 10 is, but not limited to, a tablet or a notebook computer for illustration purposes only. The electronic device 10 includes a movable module 11 (such as a cover or a display screen) and a device body module 12 with an information input section 13. A support arm 30 is disposed between the movable module 11 and the device body module 12. The support arm 30 has two pivoted ends 31, 32 at which pivot pins 40, 45 are mounted, whereby the support arm 30 is pivotally connected to the movable module 11 and the device body module 12 via the pivot pins 40, 45 respectively.

FIG. 1 shows that the device body module 12 is formed with a cavity 14 for receiving the support arm 30 when the movable module 11 is closed onto the device body module 12. The pivoted end 32 of the support arm 30 is pivotally connected in the cavity 14 via the pivot pin 45. After the movable module 11 is rotated and opened, the support arm 30 cooperates with the pivot pins 40, 45 to support and locate the movable module 11 on the device body module 12 for a user to watch or operate.

In a preferred embodiment, the locking/unlocking mechanism 20 includes a connection arm 21, which is a Y-shaped plate member disposed on the movable module 11. To speak more specifically, the movable module 11 is formed with a cavity 15 for receiving the connection arm 21. The connection arm 21 is movable between a first position and a second position within the cavity 15.

It should be noted that the first position means a start position of the connection arm 21 or a closed or locked position where the movable module 11 is fully closed onto the device body module 12. The second position means a position where the connection arm 21 is positioned after pushed by an external force or an opened or unlocked position where the movable module 11 can be rotated and opened.

Further referring to FIGS. 1 and 2, the connection arm 21 has a first and 21a and a second end 21b. An elastic unit 50 is assembled with the first end 21a of the connection arm 21 to normally keep the connection arm 21 positioned in the first position. Substantially, the elastic unit 50 has the form of a coiled spring having two ends. One end of the elastic unit 50 is affixed to the movable module 11, while the other end of the elastic unit 50 is pivotally connected to the connection arm 21. A push section 22 is disposed at the first end 21a of the connection arm 21. The push section 22 protrudes from the movable module 11 for a user to push the connection arm 21 from the first position to the second position.

At least one locking section 23 is disposed at the second end 21b of the connection arm 21. In this embodiment, there are two locking sections 23, which are perpendicularly symmetrically disposed on two sides of the second end 21b respectively. Two slits 16 are formed on the cavity 15. The locking sections 23 protrude through the slits 16 out of the movable module 11 and can be held in dents 17 formed on the device body module 12. In this embodiment, the dents 17 communicate with the cavity 14.

Further referring to FIGS. 1 and 2, each locking section 23 has a latch 24. The dent 17 is formed with a stop section 18 corresponding to the latch 24. When the connection arm 21 is moved between the first and second positions, the latch 24 of the locking section 23 latched with the stop section 18 or unlatched from the stop section 18. In this case, the movable module 11 can be opened or fully closed onto the device body module 12.

Please now refer to FIGS. 2 and 3. FIG. 2 shows that the connection arm 21 is positioned in the first position with the latch 24 latched with the stop section 18. Under such circumstance, the movable module 11 is fully closed on the device body module 12 in a locked state (with the support arm 30 received in the cavity 14). When a user pushes the push section 22 to move the connection arm 21 to the second position, the elastic unit 50 stores energy and the locking section 23 is moved to a right side of FIG. 2. At this time, the latch 24 is moved away from the stop section 18 and unlatched from the stop section 18 into an unlocked state as shown in FIG. 3. Under such circumstance, by means of the support arm 30 and the cooperative pivot pins 40, 45, the movable module 11 can be rotated and opened and located on the device body module 12 as shown in FIGS. 4 and 5. At this time, the support arm 21 can support and keep the movable module 11 located on the device body module 12 as for a user to watch and operate.

It should be noted that when the push force applied to the push section 22 disappears, the elastic unit 50 will release the previously stored energy to make the connection arm 21 move from the second position back to the first position.

When a user attempts to rotate and close the movable module 11 onto the device body module 12, the user can push the push section 22 to make the latch 24 avoid the stop section 18. After the push section 22 is released, the elastic unit 50 will make the connection arm 21 move back to the first position where the latch 24 is latched with the stop section 18 in a locked state.

In another preferred embodiment, the latch 24 is formed with a slope 25 and/or the stop section 18 is formed with guide side 19. With the slope 25 and the guide side 19, a user can directly press the movable module 11 onto the device body module 12 into the locked state without pushing the push section 22.

It should be noted that when a user applies a force to the movable module 11 to rotate and close the movable module 11 around the pivot pins 40, 45 onto the device body module 12, under the frictional locating resistance provided by the pivot pins 40, 45, the electronic device 10 (or the movable module 11) will be micro-deformed and the pivot pins 40, 45 will be stressed. As a result, actually, the pivot pins 40, 45 are not rotated to a truly closed position. It is necessary to latch the latch 24 of the locking section 23 with the stop section 18 of the dent 17 so as to lock the movable module 11 and keep the movable module 11 in a fully closed state. That is, in the case that the movable module 11 is forcedly fully closed on the device body module 12, the pivot pins 40, 45 are stressed to store energy.

Referring to FIG. 4, after the latch 24 of the locking section 23 is unlatched from the stop section 18 of the dent 17, the pivot pins 40, 45 will release the energy to automatically bound open the movable module 11 and the support arm 30. At this time, a gap s is formed between the movable module 11 and the device body module 12. This helps a user in rotating and opening the movable module 11 and the support arm 21. Therefore, the electronic device locking/unlocking mechanism of the present invention can overcome the shortcoming existing in the conventional device that it is hard to open the cover or display screen of the electronic device and a user often needs to try several times before he/she can successfully open the cover or display screen. In addition, by means of the electronic device locking/unlocking mechanism of the present invention, when opening the cover or display screen, the pressure exerted onto the user's hand is decreased.

According to the above arrangement, the electronic device locking/unlocking mechanism of the present invention is lightweight, miniaturized and slimmed. In comparison with the conventional mechanism, the present invention has the following advantages:

1. The structures and usage of the movable module 11, the device body module 12 and the relevant components (such as the locking/unlocking mechanism 20) are redesigned and different from those of the conventional mechanism. For example, the connection arm 21 is disposed between the movable module 11 and the device body module 12 and movable between the first and second positions. The elastic unit 50 is connected between the movable module 11 and the connection arm 21. The latch 24 of the locking section 23 can be latched with or unlatched from the stop section 18 of the dent 17 to lock or unlock the movable module 11. This eliminates the problem existing in the conventional mechanism that it is hard to open the cover or display screen of the electronic device.

2. By means of the push section 22 of the connection arm 21 and the elastic unit 50, a user can conveniently push the connection arm 21 to unlatch the latch 24 of the locking section 23 from the stop section 18 of the dent 17 or latch the latch 2L with the stop section 18. Also, after the latch 24 of the locking section 23 is unlatched from the stop section 18 of the dent 17, the pivot pins 40, 45 are unstressed to release the energy so as to automatically bound open the movable module 11 and the support arm 30. At this time, a gap s is formed between the movable module 11 and the device body module 12. This helps a user in rotating and opening the movable module 11. Therefore, the electronic device locking/unlocking mechanism of the present invention overcomes the shortcoming existing in the conventional device that when opening the cover or display screen, the pressure exerted onto the user's hand is increased and the operation hand feeling of the user is poor.

The above embodiments are only used to illustrate the present invention, not intended to limit the scope thereof. Many modifications of the above embodiments can be made without departing from the spirit of the present invention.

What is claimed is:

1. An electronic device locking/unlocking mechanism, which is assembled with an electronic device including a movable module, a device body module and a support arm disposed between the movable module and the device body module for supporting and locating the movable module on the device body module, the locking/unlocking mechanism being disposed on at least one of the movable module and the device body module, whereby when the movable module is closed onto the device body module, the locking/unlocking mechanism is held to lock the movable module, the support arm having two pivoted ends at which pivot pins are mounted, whereby the support arm is pivotally connected to the movable module and the device body module via the pivot pins respectively, at least one of the pivot pins being able to provide a frictional locating resistance, whereby when the movable module is closed on the device body module, the pivot pin is stressed to store energy and when the movable module is unlocked, the pivot pin unstressed to release the energy so as to automatically bound open the movable module to form a gap between the movable module and the device body module; the electronic device locking/unlocking mechanism comprising:
   a connection arm movable between a first position and a second position, the connection arm having a first end and a second end;
   an elastic unit disposed at the first end of the connection arm to normally apply an elastic force to the connection arm for keeping the connection arm positioned in the first position; and
   a locking section disposed at the second end of the connection arm, the locking section being held in a dent formed on the electronic device, when the connection arm is moved to the second position, the locking section being released from the held state, whereby the pivot pin is unstressed to automatically bound open.

2. The electronic device locking/unlocking mechanism as claimed in claim 1, wherein the electronic device is formed with a cavity for receiving the support arm.

3. The electronic device locking/unlocking mechanism as claimed in claim 2, wherein the cavity is formed on the device body module.

4. The electronic device locking/unlocking mechanism as claimed in claim 3, wherein one of the two pivoted ends of the support arm is pivotally connected in the cavity.

5. The electronic device locking/unlocking mechanism as claimed in claim 2, wherein one of the two pivoted ends of the support arm is pivotally connected in the cavity.

6. The electronic device locking/unlocking mechanism as claimed in claim 1, wherein the connection arm is disposed on the movable module.

7. The electronic device locking/unlocking mechanism as claimed in claim 1, wherein the movable module is formed with a cavity for receiving the connection arm.

8. The electronic device locking/unlocking mechanism as claimed in claim 7, wherein the connection arm is movable between the first and second positions within the cavity of the movable module.

9. The electronic device locking/unlocking mechanism as claimed in claim 7, wherein a slit is formed on the cavity of the movable module and the locking section protrudes through the slit out of the movable module.

10. The electronic device locking/unlocking mechanism as claimed in claim 1, wherein the connection arm has the form of a Y-shaped plate.

11. The electronic device locking/unlocking mechanism as claimed in claim 1, wherein the elastic unit has the form of a coiled spring.

12. The electronic device locking/unlocking mechanism as claimed in claim 1, wherein the elastic unit has two ends, one end of the elastic unit being affixed to the movable module, while the other end of the elastic unit being pivotally connected to the connection arm.

13. The electronic device locking/unlocking mechanism as claimed in claim 1, wherein a push section is disposed at the first end of the connection arm.

14. The electronic device locking/unlocking mechanism as claimed in claim 13, wherein the push section protrudes from the movable module.

15. The electronic device locking/unlocking mechanism as claimed in claim 1, wherein the locking section is perpendicular to the connection arm.

16. The electronic device locking/unlocking mechanism as claimed in claim 1, wherein there are two locking sections, which are symmetrically disposed on two sides of the second end respectively.

17. The electronic device locking/unlocking mechanism as claimed in claim 1, wherein the cavity is formed on the device body module.

18. The electronic device locking/unlocking mechanism as claimed in claim 1, wherein the dent communicates with a cavity formed on the electronic device for receiving the support arm.

19. The electronic device locking/unlocking mechanism as claimed in claim 1, wherein the locking section has a latch and the dent is formed with a stop section corresponding to the latch.

20. The electronic device locking/unlocking mechanism as claimed in claim 19, wherein the latch is formed with a slope.

21. The electronic device locking/unlocking mechanism as claimed in claim 19, wherein the stop section is formed with a guide side.

22. The electronic device locking/unlocking mechanism as claimed in claim 1, wherein the device body module has an information input section.

23. The electronic device locking/unlocking mechanism as claimed in claim 1, wherein when the movable module is fully closed on the device body module and held, the movable module is forcedly deformed.

24. The electronic device locking/unlocking mechanism as claimed in claim 1, wherein when the movable module is fully closed on the device body module and held, the pivot pin providing the frictional locating resistance is stressed.

* * * * *